Figure 1:
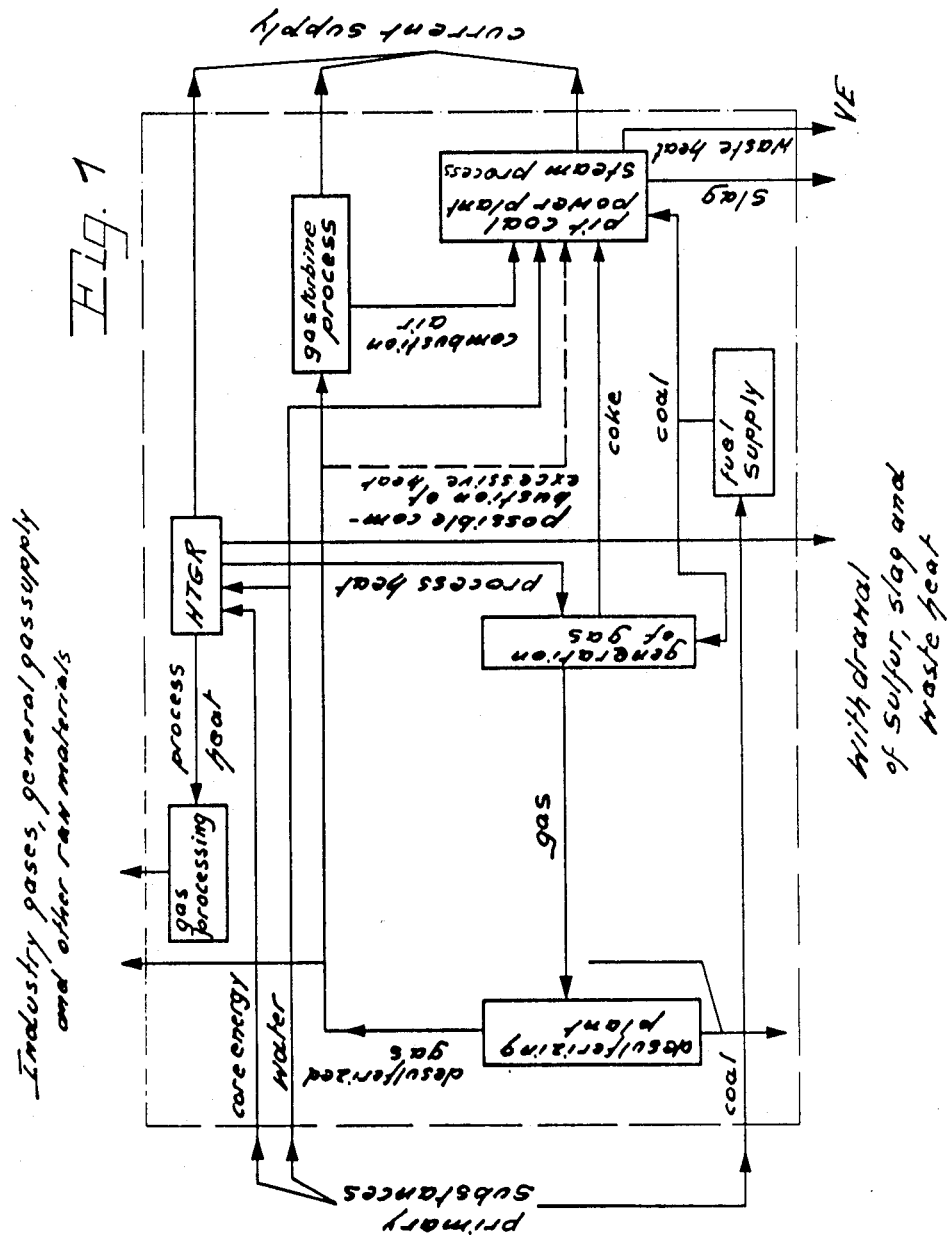

United States Patent [19]

Schuster et al.

[11] Patent Number: 4,597,257
[45] Date of Patent: Jul. 1, 1986

[54] PLANT FOR PREPARING AND HYDROLYZING FOSSIL FUELS TO PREPARE PRODUCTS LOW IN SULFUR CONTENT, AND EMPLOYMENT OF THESE PRODUCTS FOR A COMBINED GENERATION OF THE ELECTRIC CURRENT AND GAS

[75] Inventors: Ernst Schuster, Gummersbach; Klaus Knizia, Dortmund, both of Fed. Rep. of Germany

[73] Assignee: L. & C. Steinmüller GmbH, Gummersbach, Fed. Rep. of Germany

[21] Appl. No.: 923,372

[22] Filed: Jul. 10, 1978

Related U.S. Application Data

[63] Continuation of Ser. No. 726,045, Sep. 23, 1976, abandoned, which is a continuation-in-part of Ser. No. 560,574, Mar. 21, 1975, abandoned.

[51] Int. Cl.[4] .............................................. F02B 43/08
[52] U.S. Cl. .................................. 60/39.12; 60/39.183
[58] Field of Search ............. 60/39.02, 39.12, 39.18 B; 48/78, 203, 206

[56] References Cited

U.S. PATENT DOCUMENTS

| | | | |
|---|---|---|---|
| 3,086,362 | 4/1963 | Foster-Pegg | 60/39.46 |
| 3,254,976 | 6/1966 | Wolf et al. | 48/206 |
| 3,375,175 | 3/1968 | Eddinger et al. | 48/203 |
| 3,446,014 | 5/1969 | Foster-Pegg | 60/39.18 B |
| 3,481,834 | 12/1969 | Squires | 60/39.18 R |
| 3,746,522 | 7/1973 | Donath | 48/202 |

Primary Examiner—Louis J. Casaregola

[57] ABSTRACT

A plant for processing solid fossil fuels in which the fuel is crushed and is conveyed by flue gas to further processing stations. In the further stations, the fuel is desulfurized and hydrolyzed and is separated into solid and gaseous components for use in the generation of steam or for supply to a fuel gas supply network.

5 Claims, 2 Drawing Figures

PLANT FOR PREPARING AND HYDROLYZING FOSSIL FUELS TO PREPARE PRODUCTS LOW IN SULFUR CONTENT, AND EMPLOYMENT OF THESE PRODUCTS FOR A COMBINED GENERATION OF THE ELECTRIC CURRENT AND GAS

This is a continuation of application Ser. No. 726,045, filed Sept. 23, 1976 (abandoned), which is a continuation-in-part of No. 560,574, filed Mar. 21, 1975 (abandoned).

The present invention relates to a plant for preparing and breaking up, disintegrating, hydrolyzing or decomposing fossil fuels, especially coal, while under the influence of heat, solid and/or gaseous products with a low sulfur content are generated which can be utilized for a combined current and gas generation.

It is known to gasify in a chamber under pressure coal which does not cake or which cakes only slightly while gases with a low heating value are generated (on an average below 2,500 Kcal per cubic meter n). These gases are burned as fuel gases in a subsequent steam generator and/or a gas turbine or after transformation and withdrawal of certain gas components are prepared to synthesis gas or by separating the methane component are prepared into a gas with a quality similar to an earth gas.

It is known that for purposes of gasification, heat has to be added. This heat with heretofore known plants is furnished by a partial combustion with air of the coal to be gasified. In view of the high nitrogen components of the air, however, the partial combustion of the coal brings about a considerable reduction of the heating value of the gasification gas, whereby the possibilities of utilization of this gas are limited and especially the conversion into other gases, synthetic gas or natural-gas like gas is made more difficult.

Systems are known also with which oxygen is used instead of air for partial combustion of the coal. A gas with heating values around 2,500 Kcal/$m^3$n is generated thereby; this gas is easier to convert into synthetic gas or natural-gas-like gas than gas generated by use of air; however, production cost of the gas increases considerably through utilization of the very expensive oxygen.

There is also known to use steam rather than air or oxygen as gasifying medium to generate gases with heat values of 2,500 to 3,000 Kcal/$m^3$n (water gas). To this end, however, it is necessary to feed gasifying heat from the outside since partial combustion of coal is not needed therewith; construction difficulties are encountered for accommodation of heat exchanger surfaces with relatively small gasifying devices, especially when operated under pressure. Aside therefrom, for acceptable gasifying speeds there are necessary very high temperatures which on the other hand can hardly be managed upon the basis of the material side of heat exchanger surfaces. For supplying heat there can be used heat carriers of different origin. For example, the gasifying heat requirement can be met by using the heat from high temperature reactors to cover the heat required for the gasifying process; Helium for instance serves as a heat carrier therewith.

With the heretofore known plant for generating gas from coal and for using the gas for generating current and for gas supply, the individual plant sections of current generation and gas supply are arranged in series in such a manner so that when the gas generating plant fails not only gas supply fails but also the generation of current fails, gas generating plants and current generation means cannot be uncoupled which means they are not so connected constructively and also procedurally from a technical standpoint so that they are self-sufficient which means independent of each other. A further disadvantage is seen in the fact that with known plants the coal is converted completely into gaseous form and thus a great quantity of gas has to be desulfurized in order to permit the employment or use of an ecology compatible end product, for instance, to be able to use the generated gas as flue gas. A particularly great drawback is considered to be the fact that with the heretofore known gasifying method, only coal can be utilized which does not cake or cakes only slightly since otherwise the operation of these plants is not made possible. Thus automatically only a very narrow field of the entire coal types can be utilized.

Based on the above outlined drawbacks,—no possibilities of uncoupling interconnecting plant parts, desulfurization of large quantities of gas, limitation to certain coal types,—it is an object of the present invention to provide a plant for preparing and breaking up fossil fuels of any quality while under the influence of heat, solid and/or gaseous products with a low sulfur content will form which can be used for a combined current and gas production.

It is another object of this invention to provide a plant, as set forth in the preceding paragraph, in which the plant sections are so arranged with regard to each other that the solid and/or gaseous products generated during the breaking-up process in different quantities individually or together can be conveyed to different ranges of use.

These and other objects and advantages of the invention will appear more clearly from the following specification, in connection will the accompanying drawings, in which:

FIG. 1 represents a flow sheet showing the flow of the fuel and energy flux.

Figure 2:
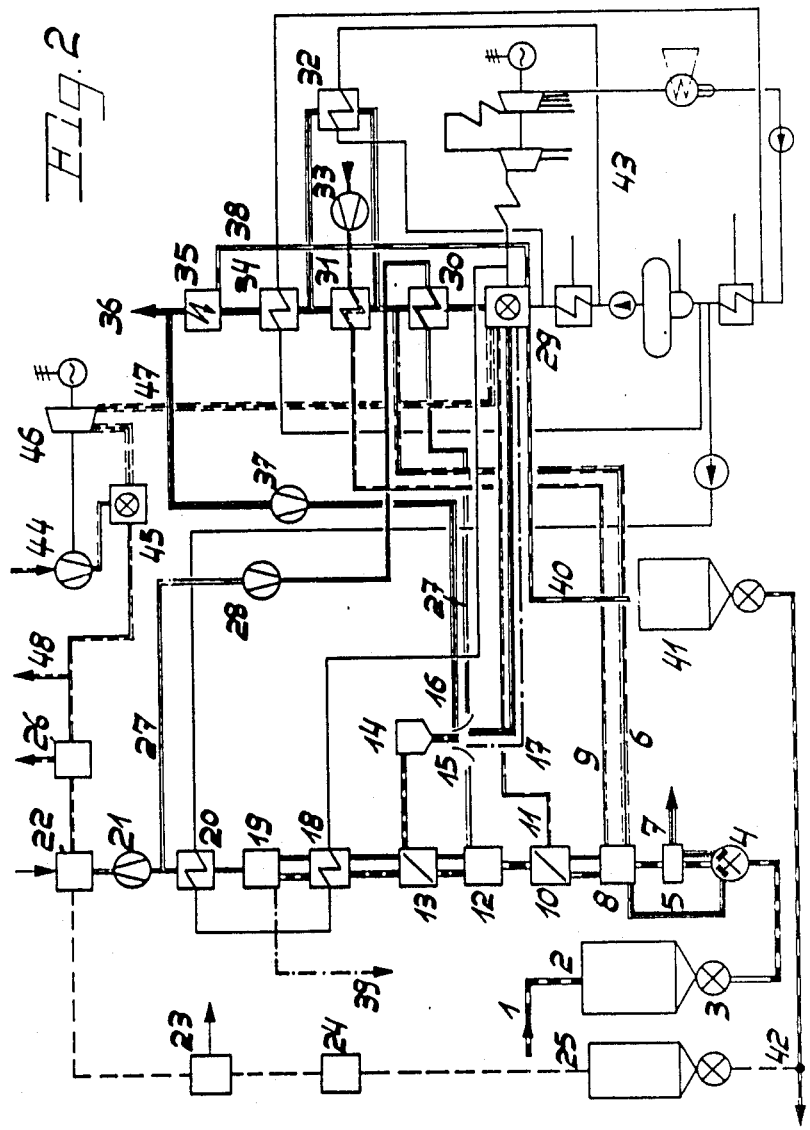

FIG. 2 diagrammatically illustrates the cooperation of the individual plant sections.

The plant according to the present invention is characterized primarily by the combination of the following plant sections:

(a) A preparing station comprising at least one diminution and drying device for generation of coal dust or pulverized coal by means of fleu gas from a steam generator dried and simultaneously warmed up to temperatures over 100° C. and of which the granular fractions greater than 0.1 mm are separated by means of a special separating device, and the same are conveyed back again to the diminution device for further diminuting, as well as at least one breaking-up or hydrolizing station for the dried and prewarmed coal dust diminuted to a granular size smaller than 0.1 mm, which includes at least one one-stage or multi-stage fast oxidation device for surface elimination of adherence capability of the coal dust during pneumatic transporting by means of oxygen-containing mediums through this device, at least one one-stage or multi-stage fast degasifying device for expelling the volatile components and gaining the coal raw gas in one or more steps with uniform or differing heating value and quantity during the pneumatic transporting through this device and/or at least one one-stage or multi-stage fast-partial gasifying device with devices for feeding different gasifying mediums for generation of gasifying gases of different composition and quantity during the pneumatic transporting through this fast partial gasifying device.

(b) A heating generation and exchange or conversion station for the heat requirement of the fuel preparation and fuel breaking-up hydrolyzing, consisting of at least one heat exchanger for regaining heat for the preparing station contained in the production of fast oxidation, fast degasifying and/or fast-partial gasifying, said station including at least one conventional steam generator and, if desired, additionally at least one high temperature reactor;

(c) At least one station for separating the solid from the gaseous product;

(d) At least one station for distributing the solid product within the preparing station for a combustion in the combustion chamber of at least one steam generator and/or a partial-fast gasifying for generating synthesis gases;

(e) At least one station for purification, especially desulfurizing the gaseous product;

(f) At least one station for distributing the product or the purified gaseous product within the preparing station in the combustion chamber, at least one steam generator and/or at least one gas turbine and/or into the network of the general gas supply and/or as the gas may be, for further preparation in specific industry gas networks;

(g) A station for converting the sulfur compounds coming from the gas purification;

(h) If desired, an accumulating and/or mixing station for the sulfur and slag from the steam generator or generators.

In the diminution and drying device, the coal is ground to granular sizes smaller than 0.1 mm and thereby with the aid of flue gases from the steam generator is dried (with soft or bituminous coal below 2% moisture) and simultaneously is heated up to temperature over 100° C. While in a normal power plant with coal dust fires approximately 25-30% of the coal dust means are greater than 0.10, the coarse portion over 0.1 mm is separated here from the dust through additionally installed separating devices and this separated portion is returned to the mill so that the subsequent breaking-up or hydrolyzing station receives a coal dust of which the granular sizes amount to less than 0.1 mm. The drying with hot flue gases having low oxygen content coming out of the steam generator practically an inert gas, permits a higher prewarming of the coal during the grinding procedure than is possible with conventionally used air grinding. The fast oxidation device is arranged for pneumatic transporting of the coal dust whereby the pneumatic conveying air, oxygen enriched air, oxygen or also a mixture of steam and oxygen is used. The fast oxidation device includes a preliminary step in which the coal dust is brought to the actual oxidation temperature from the starting temperature out of the diminution-and drying plant. This preliminary step, for instance, is embodied as a heat exchanger with which through indirect heat supply the carrier gas-coal dust mixture is heated up whereby as a heating medium there can be used flue gas, steam fluid or solid heat carriers or the like. The fast oxidation device itself is laid out for operating temperatures of 380°-500° C. The pneumatic transporting through the fast oxidation device occurs in vertical plane portions with speeds of greater than 7 meters per second and occurs in horizontal plant portions with speeds greater than 15 meters per second; the oxidation time of the coal dust in the fast oxidation device according to the oxidation temperature used amounts to 0.5-4 seconds. First this manner of treatment of the coal dust permits utilization of every type of coal for the subsequent devices (fast degasifying and fast partial gasifying) since then no disturbances arise anymore due to adherence capability in these plant portions.

The fast oxidation device can be connected directly with the subsequent fast degasifying and/or fast partial gasifying device but also the fast oxidation device can be separated therefrom. The arrangement depends upon the type of gas that is to be generated with the fast degasifying and/or partial gasifying. With direct connection of the plant parts the coal dust-carrier gas mixture discharges directly from the fast oxidation plant to the fast degasifying and/or partial gasifying device and is so treated thereby. With the separate manner of construction the preoxidized coal dust is separated from the oxidation medium in a station for separation of solid and gaseous products located subsequent to the fast oxidation device. The preoxidized coal dust is separated in a bunker from where the coal dust is fed pneumatically with a new transporting medium to the fast degasifying and/or fast-partial gasifying device. The exhaust from the fast oxidation device, in other words, the oxidation medium, is fed either to the fire of the connected steam generator with the remainder component parts of coal dust steam remaining therewith or after cooling is given off by way of a heat exchanger of the heat transfer step and subsequently into the atmosphere after dust collection.

The fast degasifying and/or partial gasifying device like the fast oxidation device is arranged for pneumatic transporting of coal dust, whereby these plants have flow therethrough in a continuous current of coal dust-carrier gas mixture from top to bottom or vice versa. If there is provided only a degasifying, the fast degasifying device can be built for indirect as well as also direct feeding of the degasifying heat. With indirect heat supply, the fast degasifying device consists of a heat exchanger in which the coal dust coming out of the fast oxidation device is heated to the desired degasifying temperature and if desired, also is left at this temperature for a particular time. Different heat carriers can be used for feeding or supplying the degasifying heat, for example, steam, flue gas out of a steam generator, fluid metals, heat carriers from nuclear energy plants connected therewith as for example, helium from high temperature reactors, solid heat carriers and the like. According to the type of heat carrier, these can flow through pipes and give off the warmth thereof outwardly to the coal dust-gas mixture circulating around the pipe, whereby the coal dust-carrier mixture flows through the pipe and the heat carrier flows around the pipe. As soon as the degasifying temperature is attained and no particular endothermic effect is to be noted during the degasifying, the further degasifying can occur in a passage without supplying any additional heat from the outside. In the fast degasifying device with indirect heat supply the degasifying temperature is limited through the work material available at the time as well as by way of the temperature of the heat carrier. The degasifying temperature accordingly is in a range between 800°-950° C., preferably at 850° C.; the degasifying time is in a range between 0.5 through 4 seconds. As a carrier gas there is used as a rule the purified gas gained from the plant itself. Naturally there is possible to use any other gaseous medium as, for instance nitrogen, steam, flue gas, etc., oxygen-containing gases, when for instance, a partial combustion is desired in so far as no particular requirements are made as to the gas to be generated. If a self-generated gas is used as the carrier gas, then gases can be generated with this fast degasifying device with heat values over 4,000 kcal/m$^3$n as far as to approximately 10,000 kcal/m$^3$n. Gas heat value and gas quantity are dependent upon degasifying time and also upon the temperature.

If the fast degasifying device is arranged for a direct heating up of the coal dust to the degasifying temperature, there are devices provided at the level of the coal dust inlet which make possible to introduce heating gases with very high temperatures at a maximum up to 1,600° C. These heating gases can be introduced tangentially into the reaction chamber or also can be introduced axially together with the preoxidized coal dust. The quantity of the heating gas is so measured that it is sufficient to heat up the coal dust from the preoxidation temperature to the degasifying temperature, for instance 800°–1,000° C., preferably 850° C. As a heating gas there is used that generated in the plant itself and after desulfurizing the gases return to the fast degasifying device which in the heat exchangers of the heat transfer station takes over the heat from the hot product gas and suitably hot coke dust while the further heating up to still higher temperatures occurs with the aid of corresponding combustion devices through partial combustion of the gas with air, oxygen or oxygen enriched air to temperatures up to 1,600° C. A further possibility for heating exists therein that in place of the heating gas or a smaller part of heating gas there is introduced an oxygen carrier, for instance air or oxygen or oxygen-enriched air with the centrally introduced coal dust, there being a portion of the coal dust, maximum approximately 15%, burned and the remaining coal dust is heated to the degasifying temperature with the quantity made free or released thereby. Both during the generation of the heating gas for temperatures up to 1,600° C. through partial combustion of the heating gas and also during heat supply by way of partial combustion of the coal there arises through combustion of hydrogen or hydrogen-containing gas component parts the resulting steam which is introduced therewith into the degasifying stack or shaft. This steam causes a particular percentage of partial gasification of the coal automatically and positively already during the degasifying which can amount to between 10 and 30% according to the reaction capability of the coke dust resulting during the degasification. The higher value is true for ligneous or soft coal, and the lower value is applicable for pit or stone coal. This means that during the degasifying with the aid of partial combustion of heating gas or coal in the fast degasifying device there arises a partial gasifying effect which possibly makes superfluous a separate partial gasifying. Whether there is used oxygen, oxygen enriched air, or air in the device for partial combustion of heating gas or of coal for covering the degasifying heat depends thereon which requirements are made of the gas to be generated. Fast degasifying devices with direct heat supply generally consist of shafts or stacks because of the high temperatures applied which are covered with fire resistant material. Special devices within the shaft or stack which have to be actuated mechanically are not provided.

The fast-partial gasifying device can be combined with the fast degasifying device, which means that fast degasifying and the fast-partial gasifying occur in the same reaction chamber. The fast-partial degasifying, however, can occur also separately from the fast degasifying. This means, that then the partial gasifying device is fed with coke dust which discharges from the fast degasifying device. If fast degasifying and fast-partial gasifying devices are to form a construction body, which means the process occurs in a common chamber, then steam is also introduced aside from the oxidation medium for partial combustion of the coal dust for gasifying. The gasifying is carried out with temperatures above 1,000° C. and takes only approximately 0.5 through 3 seconds just like the fast degasifying. If the partial gasifying occurs separately from the fast degasifying there is a station connected between both plants for separation of the solid product coke dust from the gaseous product out of the fast degasifying. The gas is then discharged after passing through the heat exchangers into the heat exchangers station to a special gas purification or cleansing for these gases while the coke dust is blown into the next subsequent fast-partial gasifying device. Such separation of fast degasifying and fast-partial gasifying is carried out advantageously only then when two basically different types of gas are to be produced in the power plant, on the one hand a combustion gas for the steam generator and the gas turbine whereby this can have a low heating value, and on the other hand synthesis gas which makes necessary the use of oxygen during the fast-partial gasifying. A station for separation of solid and gaseous products is connected after the fast-partial gasifying device. In this station the remainder of coke dust left during the partial gasifying is separated from the gas by way of a bunker or silo device or the same is guided directly to the steam generator and the gas is forwarded to a gas purifying plant. The partial gasifying degree is determined with the separated setting up of the fast degasifying and partial gasifying device according to gas requirement which must be brought to the power plant from the outside. A 100% gasifying is not provided thereby. The maximum exists at about 70%.

In the heat exchangers of the heat transfer station the perceptible heat existing in the product gases and in the coke dust generated in the particular individual steps is transferred to the mediums needed in the gas generation process, which means in the breaking-up or hydrolizing station itself; thus, for instance air, oxygen enriched air, oxygen, steam, product gas, etc. are examples thereof. The heat quantities capable of being returned are sufficient with a partial combustion of product gas to cover the heat requirement of the breaking-up or hydrolizing station, suitably even still further the heat requirement of the diminution and drying device. The connection of a conventional steam generator serves for heat supply by way of flue gases for the diminution and drying device. Naturally there is possible also the heat supply to the heat exchangers in the heat transfer station. In view of the uncoupling capability of gas generation and current generation, this connection or combination is maintained at a measure as small as possible, in a purposeful manner being completely eliminated. The heat from high temperature reactors can serve as a further heat source for the heat generation station, whereby helium functions as a heat carrier. The temperature of helium sets the limit for the utilization capability thereof in the breaking-up or hydrolizing station.

The stations for separation of solid from gaseous product are all the same in principle. They consist as a rule of cyclone separators which undertake the separation between coke dust, respectively coal dust from the carrier gas at relatively high temperatures, a maximum for example up to over 1,000° C. A small portion of the solid material introduced therewith is always taken along with the product, whereby this solid material is burned in a firing of the steam generator or is transported back into the breaking-up or hydrolizing station.

The stations for distributions of the solid product can meet different objects. Thus, the solid product or the portions thereof, for instance can be returned again to the preparing station, to the combustion chambers of one or more steam generators or to a separately provided fast-partial gasifying plant for generation of synthesis gases. As a rule, a bunker or silo is connected after the separators which as a collecting container also carries out a particular buffer function since the requirement as to solid products need not always coincide or agree with the generation of these products.

It is possible also to construct the bunker or silo plants as heat exchangers which means heat is withdrawn from the hot solid product in order to be able to transport or convey better the solid product with low temperatures or to be able to use the same further in a better manner.

For purification or cleansing, especially desulfurizing of the gaseous products there can be provided one or more stations which are laid out at a time for a very particular type of gas. Following the gas purification there are stations for distribution of the purified gaseous products which are guided either to the preparing station into the combustion chamber of at least one gas turbine or also a steam generator and/or into the network of general gas supply and/or after further preparation suitable into a special industry gas networks. The gases separated out of the gas purification with high hydrogen sulfide content are fed to a further station, for example a Claus plant where these sulfur compounds are converted into amorphous sulfur. In a collecting- and mixing station the granulated sulfur is collected together with the ash, respectively slag, from the steam generator means, the same being suitably mixed and deposited, for example in coal pits no longer capable of being mined, in the event the sale of sulfur and/or slag is not possible.

The advantages of the inventive plant can be summarized in the following points:

1. The desulfurizing of the coal occurs during the pneumatic conveying through the fast degasifying and-/or fast-partial gasifying device. The partial gasifying procedure with respect to the sulfur has additionally the object to control the ratio of the coke that is low in sulfur as introduced into the combustion chamber of the steam generator as to sulfur-free gases introduced into the steam generator. This means that with insufficient desulfurizing of the coke dust there is increased the gas quantity and the proportion of the coke dust is to be reduced. Additionally the partial gasifying naturally can serve also for generation of gas quantities greater than coming from the degasifying in the event corresponding requirement for gas exists. Generally there suffices, however, the gas quantity gained through degasifying for the combustion chambers of the gas turbine of the steam generator for clean power plant operation, which means without discharging gas to the outside. With the fast degasifying there must be purified approximately 0.6 m$^3$n gas/kg coal upon introduction of heating gas per kg coal. This represents approximately 1.3 m$^3$n/kg coal with a 30% partial gasifying with air. With a complete gasifying with oxygen this amounts to already 1.6 through 1.8 m$^3$n/kg and with a complete gasifying of the coal with air this amounts to even 3.8 m$^3$n/kg coal. From these ratio figures there is clearly apparent that in the fast degasifying- and/or fast-partial gasifying device there is carried out a desulfurizing under essentially more advantageous conditions for the subsequent purifying plants than is possible with the known plants with complete gasifying of the coal.

2. Since the capability of adherence of the coal as to the upper surface is eliminated through the fast oxidation device preconnected as to the fast degasifying and-/or fast-partial gasifying, there is noted that no special requirements are made as to the coal used so that in the subsequent plant portions no disturbances arise anymore as a consequence of the capability of adherence through the procedures occurring very fast therewith. Thus, every pit or stone coal and lignite or brown coal can be used as well as also natural turf or peat and other solid fuel materials.

3. The gas in part, high calorie gas gained in accordance with division of the fast degasifying, respectively fast-partial gasifying devices can be used for introduction in a gas turbine process preconnected before the steam power process, whereby the thermo dynamic advantages of the coupled steam gas power plant arise which leads to a higher efficiency than is attainable with the conventional coal power plants. Additionally the investment costs are lowered.

4. The gained gas can also be used as industry gas, for instance synthesis gas for the chemical industry or for ore reduction. However, also the gas can be supplied in part as high calorie gas for general gas supply.

5. The solid product, namely coke dust, arising with the breaking-up or hydrolizing binds ash collectively introduced in this form in the coal; this ash can be withdrawn as granulated slag during the combustion of the coke dust in the combustion chamber of the steam generator embodied suitably as a melting chamber.

6. The steam power plant can be uncoupled from the gas generation of the desulfurizing and gas turbine process so as to be operated as a conventional power plant. The available values for all serially connected plants accordingly reduce the availability of the current generating plant in a non-multiplying manner. This causes an essential advantage compared with the previously known plants and which is especially effective during installation of expensive or capital-intensive high temperature reactors (HTGR).

7. The gas-gaining and desulfurizing process are also so uncoupled from the actual power plant that the power plant can be built earlier under consideration of the subsequent installation of a gas generating-and desulfurizing plant and can be operated at first with a coal low in sulfur content.

8. The gas turbine process and the steam power process are uncoupled from each other in any event. In case of standstill of the gas turbine as also for the case of an undesired discharge of the generated gas as industry gas or for the open network, there is noted that this gas can be supplied to the steam generator for burning and thereby can be supplied to the current generator. The advantage of desulfurizing of the coal thereby is maintained.

9. The sulfur bound to the hydrogen can be prepared into elementary sulfur, for instance melting and in granular or in piece form in common with the granulated coal slag out of the steam generator so as to be introduced again into the mine as blowing displacement or pneumatic packing (Blasversatz)(plant).

10. The plant according to the invention also permits coupling of heat from the high temperature reactors for the preparing- and breaking-up or hydrolizing process. The proposed coupling of high temperature reactors with coal power plants makes possible the solution of the problem of gas generation with the aid of nuclear energy during simultaneous solution of the problem of ash removal, of desulfurizing and or generation of electrical energy with high economic feasibility.

11. The inventive plant is, however, capable of operation also when uncoupled from the high temperature reactor, which means that several coal power plants joined in a block are within the framework of the invention as to fuel division and fuel breaking-up or hydrolizing into fuel low in sulfur as coke dust, gas, for example whereby the heat requirement covered by the steam generator from flue gases for the fuel preparation and breaking-up or hydrolizing process later can be covered from one or more high temperature reactors.

12. The fuel preparation and fuel breaking-up or hydrolizing of the original energy carrying coal into a gaseous product within the framework of the present invention permits an economical conveying or transporting of this energy carrier in foreign environmental regions for conversion there into electrical energy or for other utilization.

13. With the inventive plant there can occur at any time a matching or adaptation to the particular current requirement, respectively gas requirement, as a consequence of the breaking-up of the coal into quantitative different gases and solid products.

14. The fossil fuel serves as an energy storage means and can briefly cover a gaseous peak requirement through increase and output upon the preparation and breaking-up side without having to provide a gas storage.

The procedural technique conventional at present according to which coal is converted into electrical energy in a steam power plant in common with the high fuel prices of coal for current generation leads thereto that the same is not capable of competing when compared with nuclear energy. In addition thereto is the fact that at present flue gas desulfurizing methods are not sufficiently developed in order to be able to fulfill the requirements as to environmental protection after suppression of the $SO_2$ emmission. These flue gas desulfurizing methods additionally would increase the current generating costs in a magnitude of more than 20% as a consequence of the increasing shortage of fluid and gaseous energy carriers there can be attributed increasing meaning as to solid fossil energy carriers for gas generation and current generation. Required therefore is a plant which permits carrying out of current generation at nominal investment costs with a higher efficiency and additionally far more nominal complexity for the desulfurizing of the fuel material is required than resulting with flue gas desulfurizing.

Since the inventive plant for improvement of the process of current generation from coal during simultaneous desulfurizing is bound moreover to degasifying and suitably to partial gasifying of the fuel, there is noted that the uncoupling of the gas so generated and purified in a $H_2S$ washing makes available from the process industry gas or gas for general supply as well as other degasifying products, for example benzol, phenylhydride, benzol coal, naphtha, benzene, if there should exist necessity additionally to have to produce industry gas or gas for general supply to a far greater extent than previously for coal, so there would result the essential advantage to be able to uncouple heat from high temperature reactors for fuel material preparation and breaking-up process and accordingly to prove the economical feasibility of the entire method because of the less expensive heat from high temperature reactors.

The utilization of the resulting coke dust as fuel material in a steam generator reduces the C/H ratio of the generated gas to an extent comparable to that realized with utilization of oil.

Additionally a portion of the coal dust generated during the degasifying can be gasified with steam through partial burning of the same or even better through heat supply from the outside, for instance, heat from nuclear energy.

These and other objects and advantages of the invention will appear more clearly from the following specification in connection with the accompanying drawing, in which:

FIG. 1 represents schematically the fuel- and energy flux;

FIG. 2 diagrammatically illustrates the cooperation of individual plant parts or sections.

As apparent from FIG. 1, there is provided a coal preparation in common for the fuel breaking-up into coke dust and gas as also for the coal power plant. This coal preparation can supply the coal power plant with fuel in the event that the generation plant for coke dust and gas is not in operation, as indicated by the connecting line, and thereby the current generation is made possible. The coal-preparing plant normally supplies the fuel material breaking-up plant or section. The generated gas is conveyed by way of the gas purification plant. The coal material not converted in the breaking-up plant is supplied as coke dust to the coal power plant and there is burned for current generation. The gas is supplied to the gas turbine process and is suitably supplied also to the combustion chamber of the steam generator or other consumers after desulfurizing. The gas burned with high excess air in the combustion chamber of the gas turbine leaves the gas turbine at around 400° C. and returns to the coal power plant as combustion air. The high temperature reactor inserted later gives off steam at a higher temperature to the fuel material breaking-up system but can also simultaneously make ready heat and steam for further procedure for conversion of the generated gas into industry gas of suitably different characteristics. Since in this case purified gas, steam and heat are necessary for carrying out the process, there is taken from the high temperature reactor either only steam or from the helium heat in gas-heat exchangers. Electrical energy is emitted from the combining of the lines providing the boundary of these systems as set forth toward the right for simplified illustration of the generated production, whereby primarily energy is gained through conversion into electrical energy in the high temperature reactor, in the gas turbine process and in the coal power plant. Industry gas and gas for general supply and other raw material gained thereby discharges from the boundary line upwardly. From the boundary line below the combined systems there is discharged the granulated slag from the steam generation of the coal power plant as well as the granulated sulfur out of the desulfurizing plant or section, which both in common are supplied to the mine as below displacement or pneumatic packing (Blasversatz) and in addition the waste heat from the HTG reactor (high temperature) and coal power plant. Primarily energy enters into the entire plant through the left boundary line, including in this gas, stone, coal or pit coal, suitably also lignite or brown coal and nuclear energy. In addition water is added as a primary material.

This simplified diagram should clarify that aside from the uncoupling possibility of the individual plant portions there is always assured the current generation also during failure of the breaking-up plant and the desulfurizing plant (during failure of the gas turbine, the coal power plant and the high temperature reactor remain in operation, both in any event independently of each other) and a building block system is utilized with which all plant portions can be connected serially or one behind the other in timed relationship as corresponds to the individual possible constructive steps. First the coal power plant and thereafter the fuel breaking-up and desulfurizing plants can be erected. The gas turbine process simultaneously can be preconnected thereto and after construction of particular power plant- and fuel material preparation pertaining thereto and breaking-up blocks there can finally be preconnected a high temperature reactor which supplies these block units with steam and heat.

FIG. 2 illustrates the fuel material- and energy-side cooperation of the individual plant portions in a simple embodiment. According to the type and quantity of the desired gas production there is noted that the enumerated plants or sections can differ from the described plant arrangement.

The coal 1 delivered by the mine or coal storage place is unloaded into a coal bunker and is conveyed through the coal dust distributor 3 to the coal mills 4. In contrast to heretofore known plants, the coal material ground to a granular size smaller than 0.1 mm is not carried out of the mills by air; this fact limits the temperature of the coal dust-air mixture in view of the possible danger of ignition limited to approximately 130° C., but is carried out by flue gas which is withdrawn from the steam generator of the coal operated power plant and as the case may be has previously passed through the fast oxidation device 8. This flue gas contains only minor quantities of oxygen and thus has the characteristic of an inert gas. The moisture contained in the coal is vaporized by the flue gas and in a vapor separator 5 is withdrawn together with the inert gas from the process. The coal dust is added to the fuel breaking-up plant. This plant consists primarily of a plant for fast oxidation 8 and of at least a reaction chamber 12 for fast degasifying and/or fast-partial gasification.

After the coal dust-carrier gas mixture has passed through the vapor separator 5, the coal dust enters into the fast oxidation device 8. Simultaneously air is conveyed by the blower 33 and highly heated, for instance to 700° C., in an air heater 31 in the steam generator of the power plant is supplied through the conduits 9 as an oxidation medium of the coal dust. The air heater 31 may, of course, also be located outside the steam generator and/or may be acted upon by other heat carriers than boiler flue gas. After the pneumatic conveying of the coal dust with the aid of the oxidation medium through the fast oxidation device at a temperature of, for instance 420° C. and a receiving time of, for instance 2.5 seconds, the coal dust-carrier gas mixture is separated from the air in an air-coal separator 10. This air is conveyed through the conduit 11 of the combustion chamber of the steam generator. Inasmuch as the coal dust carried along by the air is burned in the combustion chamber for generating electrical energy, in other words is not lost, the height of the separating degree of efficiency of the air-coal separator 10 is of not too great an importance.

The coal heated, for instance to 400° C., is separated from the air and is subsequently conveyed to the reaction chamber or chambers 12. Here the fast degasifying, respectively fast-partial gasifying of the fuel is carried out in less than 3 seconds at temperatures over 800° C. with the partial gasification, preferably over 1000° C. At this spot, steam heated to temperatures up to around 700° C. can be blown into the mixture of coal dust and carrier gas when the gas yield is to be increased, which means that a portion of the coal is additionally to be gasified. This steam could be withdrawn from a high temperature reactor. At this spot, at an indirect heating, also heat from the helium of the high temperature reactor could be coupled into the fuel breaking-up or hydrolizing process. In the flow diagramm of FIG. 2, the heat supply for the fuel hydrolizing process is illustrated by a gas flow which through the blower 28 and the gas heater 30 in the steam generator of the coal operated power plant and through the conduit 27 conveys a portion of the required heat to the reaction chamber or chambers 12, while the remaining portion is generated through partial combustion of coal dust or of gas. The gas heater 30 may, of course, be acted upon also by heat carriers located outside the steam generator and/or by heat carriers other than boiler flue gas. In the gas and coke separator 13 the generated gas is separated from coke dust. The coke dust is conveyed, for instance, with a temperature of 800° C. through an intermediate bunker system 14, by means of a pneumatic system to the firing system of the steam generator whereby inert gas, for instance flue gas, is used as the carrier gas. This carrier gas is withdrawn from behind the electro filter 35 and through the blower 37 and through the conduit 16 is conveyed to the pneumatic delivery or conveying means. The quantity of the gas-coke separation in the separator 13 is important for the load of the tar and dust separation at 19. The hot gas in a range of from 800°–1100° C. in the waste heat steam generator 18 and in the waste heat exchanger 20 gives off itself heat, for instance, to the steam power process 43 of the coal operated power plant, or also for instance in the heat exchanger to media necessary in the hydrolizing or breaking-up process. Interposed therebetween is the tar and dust separation at 19 which is located in a temperature range favorable for the tar separation. Through the conduit 39, the separated tar and residual coke is likewise conveyed to the steam generator 39 if it is not utilized as a coupling product. The purified and cooled gas has a temperature below 100° C. and is conveyed through the gas compressor 21 to the $H_2S$ washing device 22. Here the hydrogen sulfide is separated from the gas and is conveyed to the Claus plant, the sulfur granulator 24 and finally to the sulfur bunker 25. In the device 26 likewise a separation of the higher hydrocarbons occurs from the produced gas so that from here a gas is available which can be withdrawn from a high temperature reactor through the device 48 either as synthesis gas or as methane or for further conversion with the aid of steam and heat withdrawn from a high temperature reactor. Since, with a certain output of the coal operated power plant, for instance 690 MW, and an associated output of the gas turbine process of, for instance 110 MW dependent upon the coal type, possibly more gas is produced. This gas, if it has not been discharged toward the outside, can either be used in a further gas turbine process, the heat of which may be used for generation of process steam, long distance heating, etc. or may likewise be conveyed to the steam generator 29 for combustion purposes. In the preceding gas turbine process which comprises the air compressor 34, the gas turbine combustion chamber and the gas turbine 46 finally a portion of the gas is burned. Since, independently of the maximum admissible gas turbine entrance temperature, this combustion must be effected with a high excess of air, the waste gas leaves the gas turbine at approximately 400° C. and a high excess in air in the form of combustion air enters the steam generator 29. The fly ash separated in the electro-filter 35 of the steam generator 29 is conveyed through the conduit 38 again to the steam generator and is melted in its melting chamber and subsequently is withdrawn in granulated form. Through the bunker 41, at 42, the granulated coal ash, together with the granulated sulfur can be returned to the mine as stowing or packing.

As an essential difficulty it was previously considered that during the degasing there occurred already an extensive desulfuring and on the other hand, the gas and current generation is capable of being decoupled. These basic concerns that arose were completely overcome and eliminated with the inventive plant of the present disclosure.

A plant of the inventive type is preconditioned thereon that during the degasing there is necessary an extensive desulfuring which occurs and there is necessary the station arrangement for decoupling on a gaseous or current side.

What is claimed is:

1. A plant for producing solid and gaseous desulfurized fossil fuels for use in a gas power plant and a steam power plant for electric current generation, said plant comprising operatively interconnected components sequentially including in combination: crusher means for crushing the fuel to a particle size not to exceed 0.1 mm., a vapor separator, means for supplying hot, substantially inert, flue gas to the crusher means to convey the crushed fuel to the separator with simultaneous evaporation of moisture therefrom, a preoxidation station, means to convey said fuel to said preoxidation station, means to supply heated air to said preoxidation station to oxidize said fuel, a separator for separating the air from said oxidized fuel, a reaction chamber station and means to supply said chamber with the pre-oxidized fuel and in which chamber the gas content of the fuel is adjusted, means for supplying steam to said reaction chamber station to hydrolyze the fuel, a separator station past said reaction chamber station to separate the oxidized fuel from gas, an additional gas driven conveyor and distributor means for distributing the solid product from said reaction chamber station to the steam generator plant, means for extensively desulfurizing gas leaving said separator from said reaction chamber station, distributor means for distributing said desulfurized gas to said gas power plant and at least a portion of said gas to said steam generator plant.

2. A plant for producing fossil fuels as in claim 1, in which said gas generator plant includes the combustion chamber of a gas turbine therewith.

3. Apparatus for producing fuel from coal for combustion in a gas operated power plant and in a steam generator plant, comprising means for comminuting coal to a particle size less than 0.1 mm., means to dry said coal, means to oxidize said coal dust by an oxidizing gas and means to separate the oxidizing gas and the coal dust, conveying means to convey said oxidizing medium to the steam generator plant, a reaction chamber and a supply of heated carrier gas to said reaction chamber to heat and at least partially gasify said coal to produce coke and generated gas with sulfur from said coal, a separator for separating said generated gas and coke, heat exchange means for extracting heat from said generated gas, means for removing tar, and conveyor means utilizing generated gas to convey coke from said last-named separator to said steam generator plant, a $H_2S$ washing device for removing $H_2S$ from said generated gas, a combustion chamber for said gas operated power plant supplied by said generated gas and means to supply excess air for combustion to said combustion chamber, and means to convey exhaust gas with excess air from said combustion chamber to said steam generator plant.

4. An apparatus as claimed in claim 3, in which heat exchanger means through which said generated gas passes heats oxidizing air for said reaction chamber.

5. An appparatus as claimed in claim 3, in which connections are provided to remove hydrocarbons from said generated gas after removal of said $H_2S$.

* * * * *